United States Patent
Nieminen

(10) Patent No.: US 10,440,758 B2
(45) Date of Patent: Oct. 8, 2019

(54) METHOD AND ARRANGEMENT FOR ACTIVATING WIRELESS CONNECTION

(71) Applicant: Valmet Automation Oy, Espoo (FI)

(72) Inventor: Pasi Nieminen, Tampere (FI)

(73) Assignee: VALMET AUTOMATION OY, Espoo (FI)

( * ) Notice: Subject to any disclaimer, the term of this patent is extended or adjusted under 35 U.S.C. 154(b) by 0 days.

(21) Appl. No.: 15/954,905

(22) Filed: Apr. 17, 2018

(65) Prior Publication Data

US 2018/0302937 A1 Oct. 18, 2018

(30) Foreign Application Priority Data

Apr. 18, 2017 (EP) ..................................... 17166758

(51) Int. Cl.
| | |
|---|---|
| *H04W 76/10* | (2018.01) |
| *H04W 4/33* | (2018.01) |
| *H04W 4/80* | (2018.01) |
| *H04W 12/08* | (2009.01) |
| *H04W 48/16* | (2009.01) |
| *H04W 4/021* | (2018.01) |

(52) U.S. Cl.
CPC ............. *H04W 76/10* (2018.02); *H04W 4/33* (2018.02); *H04W 4/80* (2018.02); *H04W 4/021* (2013.01); *H04W 12/08* (2013.01); *H04W 48/16* (2013.01)

(58) Field of Classification Search
CPC ....... H04W 4/80; H04W 12/08; H04W 4/021; H04W 48/16
See application file for complete search history.

(56) References Cited

U.S. PATENT DOCUMENTS

| | | | |
|---|---|---|---|
| 9,905,101 B1* | 2/2018 | Billau | G08B 13/2491 |
| 2014/0280740 A1* | 9/2014 | Alley | H04L 29/08072 709/219 |
| 2014/0351374 A1* | 11/2014 | Canoy | H04L 67/10 709/217 |
| 2016/0035196 A1* | 2/2016 | Chan | H04W 4/02 340/541 |
| 2016/0133120 A1* | 5/2016 | Reibel | G08B 25/008 340/506 |
| 2017/0171747 A1* | 6/2017 | Britt | H04W 12/04 |

FOREIGN PATENT DOCUMENTS

| | | |
|---|---|---|
| WO | WO-2013/159217 A1 | 10/2013 |
| WO | WO-2015/117566 A1 | 8/2015 |
| WO | WO-2016/145455 A1 | 9/2016 |

OTHER PUBLICATIONS

Extended European Search Report issued by the European Patent Office in relation to European Patent Application No. 17166758.7 dated Oct. 24, 2017 (5 pages).

* cited by examiner

*Primary Examiner* — Jaime M Holliday
(74) *Attorney, Agent, or Firm* — Robert P. Michal, Esq.; Carter, DeLuca & Farrell LLP

(57) ABSTRACT

A wireless connection is activated by detecting in detecting means an opening of an access door providing an access to a space, and activating in response to the detection of the opening of the access door a wireless communication connection.

4 Claims, 1 Drawing Sheet

METHOD AND ARRANGEMENT FOR ACTIVATING WIRELESS CONNECTION

CROSS-REFERENCE TO RELATED APPLICATION

This Application claims priority to European Application No. 17166758.7, filed Apr. 18, 2018 the entire disclosure of which is incorporated herein by reference.

BACKGROUND

The invention relates to a method and arrangement for activating a wireless connection.

BRIEF DESCRIPTION

An object of the present invention is to provide a new method and an apparatus for implementing activation of a wireless communication connection. The objects are achieved by a method and an arrangement which are characterized by what is stated in the independent claims. The preferred embodiments of the invention are disclosed in the dependent claims.

The invention is based on the idea of coupling activation of a wireless communication connection to opening of an access door.

An advantage of the method and arrangement of the invention is that the wireless communication connection can be established easily and automatically and only when it is actually needed.

BRIEF DESCRIPTION OF THE DRAWINGS

In the following the invention will be described in greater detail by means of preferred embodiments with reference to the attached [accompanying] drawings, in which.

DETAILED DESCRIPTION OF THE INVENTION

Figure 1:
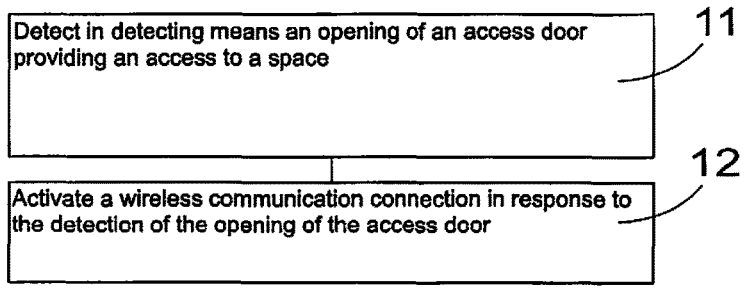
FIG. 1 illustrates a method of activating a wireless connection.

FIG. 1 illustrates a method of activating a wireless connection. The method may comprise detecting 11 in detecting means 2 an opening of an access door 5 providing an access to a space 6. The method may further comprise activating 12 a wireless communication connection 7 in response to the detection of the opening of the access door 5. In other words, a wireless communication connection may be established and/or switched on in response to the detection of the opening of the access door 5.

According to an embodiment, the method may be implemented by an arrangement 1 according to an embodiment disclosed in this description or a combination thereof.

According to an embodiment, the detecting means 2 may comprise a detector. According to an embodiment, the detector may comprise at least one of the following: a microswitch, an optical sensor, an inductive sensor, a passive infrared sensor (PIR), a radar, an image sensor, a camera and a tactile sensor. In different embodiments, the detecting means may be provided in connection with the access door 5, in other words attached or indirectly connected to the access door 5, in connection with the space 6, in other words inside the space or attached to an object provided in the space for example, or outside the space 6 and the access door 5, as long as the detecting means can be arranged to detect opening of the access door 5.

According to an embodiment, the access door 5 may comprise a hatch, lid, door, sliding door or similar providing access to the space 6 in an open position and, on the other hand, capable of preventing access to the space 6 once the access door 5 is in a closed position of the access door.

According to an embodiment, the space 6 may comprise a cabinet, a locker, a cupboard, a room, a sub-process space, a lift or the like. According to an embodiment, the space 6 may comprise at least one of the following an electronics cabinet, an electrics cabinet, a base station, a locker in a storage system, such as in a locker room, in a package machine, in a luggage storage or the like, a room, such as a monitoring room, a control room or the like, and an elevator.

According to an embodiment, the wireless communication connection 7 comprises a short-range or medium-range wireless communication connection. The short-range wireless communication connection may comprise a communication connection such as Bluetooth, Bluetooth Smart, ANT (+), ZigBee, Z-Wave, Light Fidelity (LiFi) or some other suitable short-range wireless communication connection. The medium-range wireless communication connection may comprise a communication connection such as wi-fi.

According to an embodiment, a unique identifier may be associated with wireless connection means 4 providing the wireless communication connection, such that the wireless connection means 4 that has activated and/or established the wireless communication connection can be identified. According to a further embodiment, the wireless connection means 4 and the associated unique identifier may be unique for the space 6 that may be accessed through the access door 5. Thereby, the space 6 too may be identified based on the wireless connection means 4 that activated and/or established the wireless communication connection. In other words, opening the specific access door 5 may activate the specific wireless communication connection 7. The specific wireless connection 7 may be identified on the basis of the specific wireless connection means 4 activating and/or establishing the connection Thereby, the activation of the specific wireless communication connection 7 by the specific wireless connection means 4 indicates the opening of the access door 5 to the specific space 6. In different embodiments, this information may be used for a multitude of uses, such as identifying the space being checked for security purposes, for example, identifying the space being occupied, identifying the equipment accessed based on accessing a space wherein the equipment is provided, and so on.

According to an embodiment, a mobile device 8 provided within the range of the activated wireless communication connection 7 may be detected. Solutions for the detection of a mobile device 8 within wireless communication connections depend on the wireless communication connection technology used and are known as such and are thereby not described in more detail. A wireless communication connection 7 may be established to the mobile device 8 in response to the activating of the wireless communication connection 7 and the detecting of the mobile device 8 within the range of the activated wireless communication network. In other words, the mobile device 8 may be connected to the wireless communication connection 7 in response to the activating of the wireless communication connection 7 and the detecting of the mobile device 8 within the range of the activated wireless communication network. According to an embodiment, a mobile device 8 provided within the range of the activated wireless communication connection 7 may be detected by processing means 3.

According to an embodiment, the mobile device 8 may comprise a mobile phone, a tablet, a laptop, smart glasses, a smart watch or other handheld device or wearable device, for example.

According to an embodiment, location of the mobile device may be determined in processing means 3 based on the established wireless communication connection 7. In other words, the processing means 3 may be arranged to determine the location of the mobile device 8 based on the established wireless communication connection. According to an embodiment, the wireless communication connection may comprise a short-range or medium-range coverage and have a unique identifier associated with the specific wireless communication connection and, thereby, with the space 6. According to an embodiment, the location of the space 6 may be known. Thereby, the location of the mobile device 8 may be determined in response to detecting in the processing means 3 the wireless communication connect 7 established with the mobile device 8, as the mobile device 8 is, in other words, located within the range of the wireless communication connection.

According to an embodiment, processing means 3 may be arranged to send content associated with the space 6 or equipment 9 provided in the space 6 to the mobile device 8 in response to activating the wireless communication connection 7 and establishing the wireless communication connection to the mobile device 8. In other words, the wireless communication connection 7 may be used to identify the space 6 that is accessed by opening the access door 5.

According to an embodiment, the mobile device 8 connected to the wireless communication connection 7 may be identified in response to the establishing the wireless communication connection 7 to the mobile device 8. Information about the mobile device and the established wireless communication connection may be stored in memory means. The memory means may comprise memory that may be provided as a part of the processing means 3 or the memory means may be separate from the processing means 3. In various embodiments, the memory may include volatile and/or non-volatile memory and typically stores content, data, or the like. For example, the memory may store computer program code such as software applications or operating systems, information, data, content, templates or the like for the processor to perform steps associated with operation of the apparatus in accordance with embodiments. In the illustrated embodiment, the memory may be, for example, random access memory (RAM), a hard drive, or other fixed data memory or storage device. Further, the memory means, or part of it, may be removable memory detachably connected to the processing means. According to an embodiment, the memory means may be provided at a remote location at a distance from the space 6 and/or the processing means 3.

According to an embodiment, a closing of an access door 5 providing an access to a space may be detected in detecting means. According to an embodiment, the wireless communication connection may be deactivated in response to the detection of the closing of the access door. According to another embodiment, the wireless communication connection may be kept activated regardless of the detection of the closing of the access door.

According to an embodiment, opening of the access door 5 may be detected in response to activating of the wireless communication connection 7. The wireless communication connection 7 may be activated by the wireless connection means 4. Information about the opening of the access door 5 may be transmitted through a communication network. This communication network may be wireless or wired and it may connect the space 6 and/or the processing means 3 to external resources that may be either local resources or remote resources depending on the embodiment. According to an embodiment, the information may comprise at least one of the following: information about the access door opened, information about the space accessed, information about the time of the activation of the wireless communication connection, information about the time of deactivation of the wireless communication connection and at least one mobile device connected the wireless communication connection.

According to an embodiment, the wireless communication connection 7 may be encrypted. Thereby, data transmitted using the wireless communication connection 7 may be secured.

According to an embodiment, information about authorized mobile devices 8 may be stored in the memory means. In other words, information about mobile devices 8 permitted to connect to the wireless communication connection 7 may be stored in the memory means. The information about authorized mobile devices 8 may for instance comprise a list of the authorized mobile devices 8. According to an embodiment, the processing means 3 may be configured to activate an alarm in response to detecting an opening of the access door 5 but not detecting any permitted mobile device 8 within the coverage area of the wireless communication connection 7. The alarm may comprise a local alarm, such as a visual or audio alarm, and/or an alarm signal transmitted to a communication network. This may be used to detect unauthorized entry to the space 6, unauthorized access to any data or equipment provided in the space and/or prevent other similar unauthorized activities and crimes.

Figure 2:
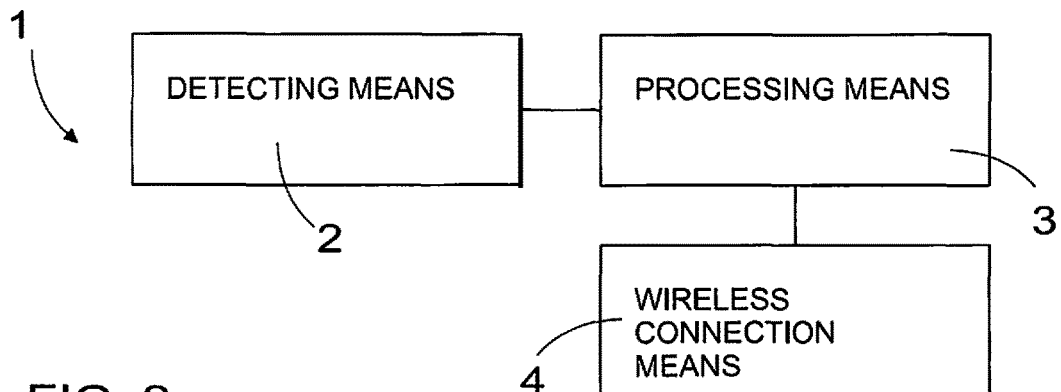
FIG. 2 illustrates an arrangement for activating a wireless connection.

FIG. 2 illustrates an arrangement for activating a wireless connection. The arrangement 1 for activating a wireless connection may comprise detecting means 2. The detecting means 2 may be arranged in connection with the space 6 and the access door 5 providing access to the space 6. The detecting means 2 may be arranged to detect an opening of the access door 5 providing access to the space 6. The arrangement 1 may further comprise processing means 3 for activating a wireless communication connection 7 with wireless connection means 4 in response to the detection of the opening of the access door 5. The processing means 4 may comprise a microprocessor, a computer processor, application-specific integrated circuit (ASIC), field-programmable gate array (FPGA), and/or any other hardware component that has been programmed in such a way to carry out one or more steps and/or functions of an embodiment.

The arrangement 1 may comprise features disclosed in connection with other embodiments, such as method related embodiments, described in this description or a combination thereof. The arrangement 1 or its components may be used for implementing at least one step or function described in this description.

According to an embodiment, the processing means may further be arranged to detect a mobile device 8 provided within the range of the activated wireless communication connection 7. The processing means may further be arranged to establish a wireless communication connection 7 to the mobile device 8 in response to the activating of the wireless communication connection 7 and the detecting of the mobile device 8 within the range of the activated wireless communication network 7.

According to an embodiment, the processing means 3 may further be arranged to detect a mobile device 8 provided within the range of the activated wireless communication connection. The processing means 3 may also be arranged to establish a wireless communication connection 7 to the mobile device 8 in response to the activating of the wireless communication connection and the detecting of the mobile device 8 within the range of the activated wireless communication network 7. The processing means 3 may further be arranged to send content associated with the space 6 or equipment 9 provided in the space 6 to the mobile device 8 in response to activating the wireless communication connection and establishing the wireless communication connection to the mobile device. In other words, the arrangement 1 may be arranged to provide a mobile device 8 provided in the range of the wireless communication connection 7 and connected thereto with content that is specific to the equipment 9 or space 6 the access door 5 of which was opened using the wireless communication connection 7 activated in response to the opening of the access door 5.

Figure 3:
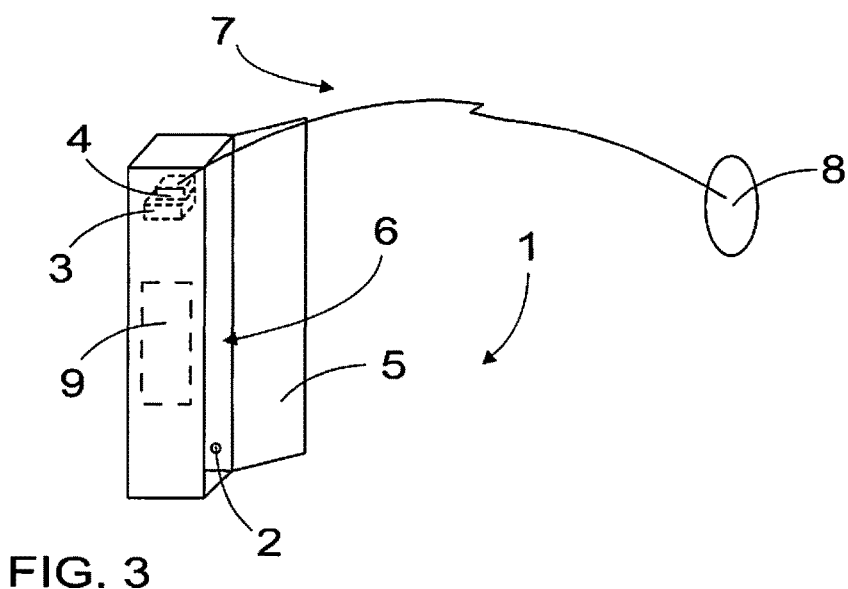
FIG. 3 is another schematic illustration of an arrangement for activating a wireless connection.

FIG. 3 is another schematic illustration of an arrangement for activating a wireless connection.

According to an embodiment, the space 6 may comprise a room, space or a cabinet comprising equipment for maintaining an industrial system, such as an industrial automation system, an industrial electrical system, an industrial electronics system, an industrial pressure medium system, or some other industrial system requiring ad hoc and/or periodic maintenance. Opening of the access door 5 to the space 6 may thus be arranged to activate the mobile communication connection. A mobile device 8 detected within the range of the wireless communication connection and connected thereto. The mobile device 8 may then be provided with content associated with the space 6 and/or equipment 9 provided in the space, such as configuration information, location information, maintenance information, such as amount of wear or estimated remaining operating life, or alerts and alarms.

According to an embodiment, a plurality of spaces 6 may be arranged within a limited area, such as a building, a room, a plant, a work site, a maintenance site, or similar. Each of these spaces 6 may be provided with an access door 5 providing an access to the space 6. Each of the spaces 6 may also comprise detecting means 2 for detecting an opening of the access door 5 providing access to the space 6, processing means 3 for activating a wireless communication connection 7 in response to the detection of the opening of the access door 5, and wireless connection means 4 for providing the wireless communication connection 7. According to an embodiment, a unique identifier may be associated with each of the wireless connection means 4. Thereby, the space 6 and/or equipment accessed may be identified on the basis of the unique identifier of the wireless connection means 4 providing the activated wireless communication connection 7. According to an embodiment, the wireless communication connections 7 provided by the space-specific wireless connection means 4 may all have a common network identifier, such as a SSID. Thereby, a mobile device 8 may be configured to connect to any one of the wireless communication connections 7 depending on which one of them is activated in response to detecting an opening of the space-specific access door 5 or has the strongest signal at a specific moment of time.

According to an embodiment, a plurality of spaces 6, such as automation system cabinets, may be arranged within a limited area, such as a work site, a maintenance site, or similar. Each of these automation system cabinets may be provided with an access door 5 providing an access to the automation system cabinet in question. Each of the automation system cabinets may also comprise detecting means 2 for detecting an opening of the access door 5 providing access to the automation system cabinet, processing means 3 for activating a wireless communication connection 7 in response to the detection of the opening of the access door 5, and wireless connection means 4 for providing the wireless communication connection 7. According to an embodiment, a unique identifier may be associated with each of the wireless connection means 4. Thereby, the automation system cabinet and/or equipment accessed may be identified on the basis of the unique identifier of the wireless connection means 4 providing the activated wireless communication connection 7. According to an embodiment, the wireless communication connections 7 provided by the space-specific wireless connection means 4 may all have a common network identifier, such as a SSID. Thereby, a mobile device 8 may be configured to connect to any one of the wireless communication connections 7 depending on which one of them is activated in response to detecting an opening of the space-specific access door 5 or has the strongest signal at a specific moment of time. According to an embodiment, the mobile device 8 may comprise a laptop and processing means 3 provided in connection with an automation system cabinet may be arranged to detect in detecting means 4 an opening of an access door 5 providing an access to the automation system cabinet. The wireless connection means 4 provided in connection with the automation system cabinet may be arranged to activate in response to the detection of the opening of the access door a wireless communication connection. The automation system cabinet accessed, in other words the automation system cabinet, the access door 5 of which is opened, may be identified the unique identifier of the wireless connection means 4 provided in connection with the automation system cabinet. The mobile device 8, such as the laptop, may connect to the processing means 4 through the activated wireless communication connection 7. The space 6, such as the automation system cabinet, accessed may be identified on the basis of the associated wireless connection means 4 and the unique identifier of the wireless connection means 4. Then, content associated with the space 6, such as the automation system cabinet, and/or equipment 9 provided in the space may be provided to the mobile device 8, such as the laptop, in response to detecting opening the access door 5 and/or activating the wireless communication connection 7. The content may comprise for instance configuration information, location information, maintenance information, such as amount of wear or estimated remaining operating life, or alerts and alarms related to the space 6, such as the automation system cabinet, and/or the equipment provided therein.

One benefit of some embodiments is that safety can be improved as information associated with the space is only provided once the access door to the space has been opened. Safety can be further improved by only providing the content associated with the space or equipment provided in the space in response to identifying the mobile device connected to the wireless communication connection as an authorized mobile device in any manner known as such. Another benefit of some of the embodiments is that power consumption may be decreased as the wireless communication connection is only activated once the access door is opened and, thus, the connection is actually needed.

It will be obvious to a person skilled in the art that, as the technology advances, the inventive concept can be implemented in various ways. The invention and its embodiments are not limited to the examples described above but may vary within the scope of the claims.

The invention claimed is:

1. A system for activating a wireless connection, the system comprising:
   a detector arranged in connection with a space in an automation system cabinet and an access door of the automation system cabinet providing access to the space, wherein the detector is arranged to detect an opening of the access door providing access to the space and a closing of the access door from an open state to a closed state,
   programmed hardware communicatively coupled to the detector for receiving the detection and programmed for activating a wireless communication connection in response to the detection of the opening of the access door and deactivating the wireless communication connection in response to the detection of the access door moving from the open state to the closed state,
   a communication connection communicatively coupling the detector and the programmed hardware, wherein the programmed hardware is further programmed to:
      detect a mobile device provided within the range of the activated wireless communication connection,
      establish a wireless communication connection to the mobile device in response to the activating of the wireless communication connection and the detecting of the mobile device within the range of the activated wireless communication network, and
      send content associated with the space or equipment provided in the space to the mobile device in response to activating the wireless communication connection and establishing the wireless communication connection to the mobile device, wherein the content associated with the space or equipment includes at least one of configuration information, location information, or maintenance information.

2. A method of activating a wireless connection comprising:
   detecting, by a detector, an opening of an access door of an automation system cabinet providing access to a space defined within the automation system cabinet,
   electronically communicating the detection from the detector to a hardware programmed to activate and deactivate a wireless communication connection,
   activating, by the programmed hardware in response to the detection of the opening of the access door, the wireless communication connection,
   detecting a mobile device provided within the range of the activated wireless communication connection,
   establishing a wireless communication connection to the mobile device in response to the activating of the wireless communication connection and the detecting of the mobile device within the range of the activated wireless communication network,
   sending, by the programmed hardware, content associated with equipment provided in the space to the mobile device in response to activating the wireless communication connection and establishing the wireless communication connection to the mobile device, wherein the content includes at least one of configuration information, location information, or maintenance information,
   detecting, by the detector, a closing of the access door from an open state to a closed state, and
   deactivating the wireless communication connection in response to the detection of the access door moving from the open state to the closed state.

3. A method according to claim 2, wherein the wireless communication connection comprises a short-range or medium-range wireless communication connection.

4. A method according to claim 2, further comprising:
   determining, by the programmed hardware, location of the mobile device based on the established wireless communication connection.

* * * * *